US008165101B2

(12) United States Patent
Abhishek et al.

(10) Patent No.: US 8,165,101 B2
(45) Date of Patent: Apr. 24, 2012

(54) AUTOMATIC DETECTION OF HIDDEN NETWORKS

(75) Inventors: Abhishek Abhishek, Woodinville, WA (US); Amir Zohrenejad, Seattle, WA (US); Yue Chen, Bellevue, WA (US); Andrew Baron, Redmond, WA (US); Yi Lu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 11/540,070

(22) Filed: Sep. 29, 2006

(65) Prior Publication Data

US 2008/0082543 A1 Apr. 3, 2008

(51) Int. Cl.
*H04W 4/00* (2009.01)
*H04L 12/54* (2006.01)
(52) U.S. Cl. .................. 370/338; 370/428; 370/429
(58) Field of Classification Search ............ 370/338
See application file for complete search history.

(56) References Cited

U.S. PATENT DOCUMENTS

| | | | |
|---|---|---|---|
| 5,121,408 A | 6/1992 | Cai et al. | |
| 2003/0118034 A1* | 6/2003 | Furukawa et al. | 370/400 |
| 2004/0093398 A1 | 5/2004 | Tang et al. | |
| 2004/0095942 A1 | 5/2004 | Lung | |
| 2004/0110530 A1* | 6/2004 | Alone et al. | 455/426.1 |
| 2004/0236851 A1 | 11/2004 | Kuan et al. | |
| 2004/0253969 A1 | 12/2004 | Nguyen et al. | |
| 2005/0009565 A1 | 1/2005 | Kwak | |
| 2005/0054326 A1 | 3/2005 | Rogers | |
| 2005/0286456 A1 | 12/2005 | McNew et al. | |
| 2006/0062220 A1 | 3/2006 | Suga | |
| 2006/0135068 A1 | 6/2006 | Jaakkola et al. | |
| 2007/0026856 A1* | 2/2007 | Krantz et al. | 455/426.1 |
| 2007/0091861 A1* | 4/2007 | Gupta et al. | 370/338 |
| 2008/0014934 A1* | 1/2008 | Balasubramanian et al. | 455/434 |

OTHER PUBLICATIONS

Frankel et al., "Guide to IEEE 802.11i: Establishing Robust Security Networks," http://csrc.nist.gov/publications/drafts/Draft-SP800-97.pdf, Jun. 2006.
Lee and Miller, "Network Selection and Discovery of Service Information in Public WLAN Hotspots," ACM Press, New York, New York, 2004, pp. 81-92, http://delivery.acm.org/10.1145/1030000/1024744/p.82-lee.pdf.

(Continued)

*Primary Examiner* — Charles Appiah
*Assistant Examiner* — Natasha Cosme
(74) *Attorney, Agent, or Firm* — Wolf, Greenfield & Sacks, P.C.

(57) ABSTRACT

It is determined whether a mobile user device is within transmission range of one or hidden networks. A list of known networks may be accessed, the list including broadcast and hidden networks. For the hidden networks, the network connection component may instruct a network interface to actively probe for the hidden networks. If the response is received for a communication corresponding to a particular network, then it may be considered that the mobile user interface is within transmission range of the hidden network. If auto-connection logic is activated, a preference order may be applied to select which of the detected broadcasts and/or hidden networks to connect. A user interface displays broadcast and hidden networks determined to be within transmission range of the mobile user device. The user device also displays hidden networks for which it has not yet been attempted to determine whether the hidden networks are in range.

4 Claims, 6 Drawing Sheets

OTHER PUBLICATIONS

Pike and Osborne, "Wi-Fi and Handhelds—Perfect Synergy," ACM Press, New York, New York, 2004, pp. 1004-1018, http://delivery.acm.org/10.1145/990000/985955/p1004-pike.pdf? key1=985955&key2=2269064511&coll=Guide&dl=portal.

Royster, Glenn, "Wireless Security Hodgepodge," http://www.infosecwriters.com/text_resources/pdf/Wireless_Security-Hodgepodge.pdf, 2005.

* cited by examiner

AUTOMATIC DETECTION OF HIDDEN NETWORKS

BACKGROUND

Most wireless access points (APs) of a wireless network, for example, a Wi-Fi AP, are configured to broadcast their network name (e.g., service set identifier (SSID)). This broadcasting allows mobile user devices (i.e., wireless clients) to detect the presence of a wireless network when scanning for wireless networks within its transmission range (i.e., in range). In response to determining that one or more wireless networks are within its range, a mobile user device may indicate the presence of available networks to the user (e.g., as part of a user interface display) and/or may automatically connect to one of the detected wireless networks, for example, through predefined auto-connection logic.

There are, however, many APs on the market today that can be configured not to broadcast the SSIDs of the wireless networks for which they provide access. As used herein, a "hidden network" is a network for which a network identifier (e.g., name) is not broadcast from a wireless access point. Further, a "broadcast network" is a network for which a network identifier is a broadcast from a wireless access point. Mobile user devices that have knowledge of these hidden networks and want to connect to them, need to actively probe for them based on the network SSID. Due to the perceived security benefit of not broadcasting an SSID, the practice of hiding the SSID has become fairly common in wireless deployments.

While some operating systems, such as, for example, Windows® XP, support connections to hidden networks, the overall connection logic and user interface of such operating systems are designed for networks that broadcast their SSID. As a result, the user interface and auto-connection logic are not able to handle hidden networks in a graceful manner.

SUMMARY

This Summary provides an illustrative context for aspects of the invention, in a simplified form. It is not intended to be used to determine the scope of the claimed subject matter. Aspects of the invention are described more fully below in the Detailed Description.

Described herein, in some embodiments, are systems and methods that utilize a wireless network configuration setting which specifies whether a network broadcasts its SSID. That is, the network configuration setting indicates whether the network is a hidden network. As a result, network connection services have the ability to differentiate between hidden networks and broadcast networks.

In some embodiments of the invention, a preference order of networks defined on a mobile user device is maintained, the preference order including hidden networks and broadcast networks. When hidden and/or broadcast networks are determined to be in range of a mobile user device, this preference order may be applied (e.g., a part of auto-connection logic) to connect the mobile user device to the detected networks having the highest preference (i.e., precedence or priority).

In some embodiments, to determine whether a mobile user device is in a transmission range of one or more hidden networks, a list of known networks (i.e., networks for which a configuration has been defined on the mobile user device) may be accessed (e.g., by a network connection component on the mobile user network device), the list including broadcast and/or hidden networks. Detecting the presence of the broadcast networks may be performed using known techniques. A network interface (i.e., a network interface card) (NIC) may actively probe for the hidden networks. Actively probing may include transmitting a communication that specifies an identifier (e.g., an SSID) of a hidden network and listening for responses. If the response is received for a communication corresponding to a particular network, then it has been determined that the mobile user interface is within transmission range of the hidden network. If auto-connection logic is activated, a preference order may applied to determine which of the detected broadcasts and/or hidden networks to which to connect.

In some embodiments of the invention, one or more hidden networks are configured for automatic probing whereas as others are configured for optional probing. As used herein, an "optional probing network" is a hidden network configured for optional probing, and an "automatic probing network" is a hidden network configured for automatic probing. Optional probing networks require a user to request that an active probe for the hidden network be performed; otherwise, probing is not performed. It should be appreciated that actively probing for a network exposes information concerning a hidden network (i.e., an SSID), which creates a security threat. Thus, configuring a hidden network for optional probing helps reduce the security threat, enabling a user to control if and when an active probe is performed for a hidden network.

In some embodiments of the invention, a user interface is provided that displays to a user a list of optional probing networks. For example, a list of "available networks" may be provided by the user interface, and this list may include optional probing networks for which it has not actually been determined whether they are "available" (i.e., within transmission range of the mobile user device). The user interface may be configured to enable the user to select one or more optional probing networks and specify that active probing be performed for the selected network. It should be appreciated that the "available networks" user interface may include not only the broadcast networks currently in range, but also hidden networks configured for automatic probing (i.e., automatic probing networks) that are currently in range. If it is determined, after instructions from the user, that an optional probing network is within transmission range, the user interface may update the list of networks to reflect that the optional probing network is currently in range.

In some embodiments of the invention, it is determined that a hidden network previously unknown to the mobile user device is within transmission range of the mobile user device, and this information is indicated to the user (e.g., displayed to the user). This determination may be made by determining that a communication received from a wireless access point (i.e., a beacon) includes a null value in a portion of the communication reserved for the identify (i.e., the SSID) of the network. The user then may create a definition of the previously unknown hidden network and/or request that a connection be established to the network.

In some embodiments of the invention, the user interface is configured to provide a list of networks including, but not limited to any of the following: broadcast networks in range; hidden networks in range; optional probing networks for which it has not yet been determined whether the network is in range; previously unknown hidden networks in range; other types of networks; and any suitable combination of the foregoing.

In an illustrative embodiment of the invention, communications are initiated between a mobile user device and a network. A list of known networks previously defined on the mobile user device are accessed, the list including at least one hidden network. It is determined which of the known networks, including the at least one hidden network, are within transmission range of the mobile user device.

In another illustrative embodiment, a computer program product comprising at least one computer-readable medium with computer-readable signals stored thereon is provided. The computer-readable signal defines instructions that, as a result of being executed by a computer, control of the computer to perform a method of enabling a user of a mobile user device to initiate communications between the mobile user device and the network. The method includes an act of: (A) providing user display to the user, including a list of one or more networks currently within the transmission range of the mobile user device. The list also includes one more hidden networks previously defined on the mobile user device. For each of the one or more hidden networks, it is unknown whether a hidden network is currently in range.

In yet another illustrative embodiment, a system is provided for enabling a user of a mobile device to initiate communications between the mobile user device and the network. The system includes a network connection component to determine that a hidden network previously unknown to the mobile user device is within transmission range of the mobile user device. The network connection component is operative to initiate notifying a user of the mobile user device that the previously unknown hidden is within transmission range.

Other advantages, novel features, and objects of the invention, and aspects and embodiments thereof, will become apparent from the following detailed description of the invention, including aspects and embodiments thereof, when considered in conjunction with the accompanying drawings, which are schematic and are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

The function and advantages of embodiments of the present invention described above and other embodiments will be more fully understood from the examples described below. The following examples are intended to facilitate a better understanding and illustrate the benefits of the present invention, but do not exemplify the full scope of the invention.

DEFINITIONS

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

As used herein, a "network" is a group of two or more components interconnected by one or more segments of transmission media over which communications may be exchanged between the components. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two components connected by a single wire, bus, wireless connection, or other type of segment. Further, it should be appreciated that when a network is illustrated in a drawing of this application as being connected to an element in the drawing, the connected element itself is considered part of the network.

As used herein, a "network device" is a device operative to communicate on a network, including, but not limited to: workstations, personal computers, terminals, laptop computers, end stations, user devices, servers, gateways, registers, switches, routers, hubs, bridges, directories, transmitters, receivers, transceivers, wireless access points (APs), repeaters, and any combinations thereof. As used herein, a "user device" is a network device from/to which a user may send/receive communications, and which may serve as an endpoint to communications on a communications network. User devices include, but are not limited to: workstations; personal computers (e.g., PCs); laptop computers, notebook computers; telephones (e.g., landline, mobile, smart, IP-enabled, other types of telephones or any suitable combination of the foregoing); pagers; Blackberry™ brand devices, PCS devices, personal digital assistants (PDAs), two-way radios (e.g., "walkie-talkies"), other types of user devices, and any suitable combination of the foregoing.

A network (e.g., any of networks 102, 116 and 118 described below) may be or include any of a variety of types of networks including, but not limited to, a local area network (LAN), a metropolitan area network (MAN), a wide-area network (WAN), a wireless network, a Public Land Mobile Network (PLMN), a Global System for Mobile Communications (GSM) network, a General Packet Radio Service (GPRS) network, a Universal Mobile Telecommunications System (UMTS) network, a Code-Division Multiple Access (CDMA) network, an optical network, a data network, an enterprise-wide network, a wireless personal area network (PAN), a home network, a telecommunications network, a public switched telephone network (PSTN), a broadband network, another type of network, or any suitable combination of the foregoing.

As used herein, a "user interface" is an application or part of an application (i.e., a set of computer-readable instructions) that enables a user to interface with an application during execution of the application. A user interface may include code defining how an application outputs information to a user during execution of the application, for example, visually through a computer screen or other means, audibly through a speaker of other means, and manually through a game controller or other means. Such user interface also may include code defining how a user may input information during execution of the application, for example, audibly using a microphone or manually using a keyboard, mouse, game controller, track ball, touch screen or other means.

The user interface may define how information is visually presented (i.e., displayed) to the user, and defines how the user can navigate the visual presentation (i.e., display) of information and input information in the context of the visual presentation. During execution of the application, the user interface may control the visual presentation of information and enable the user to navigate the visual presentation and enter information in the context of the visual presentation. Types of user interfaces range from command-driven interfaces, where users type commands, menu-driven interfaces, where users select information from menus, and combinations thereof, to GUIs, which typically take more advantage of a computer's graphics capabilities, are more flexible, intuitive and easy to navigate and have a more appealing "look-and-feel" than command-driven and menu-driven visual user interfaces. As used herein, the visual presentation of information presented by a user interface or GUI is referred to as a "user interface display" or a "GUI display", respectively.

EXAMPLES

Figure 1:
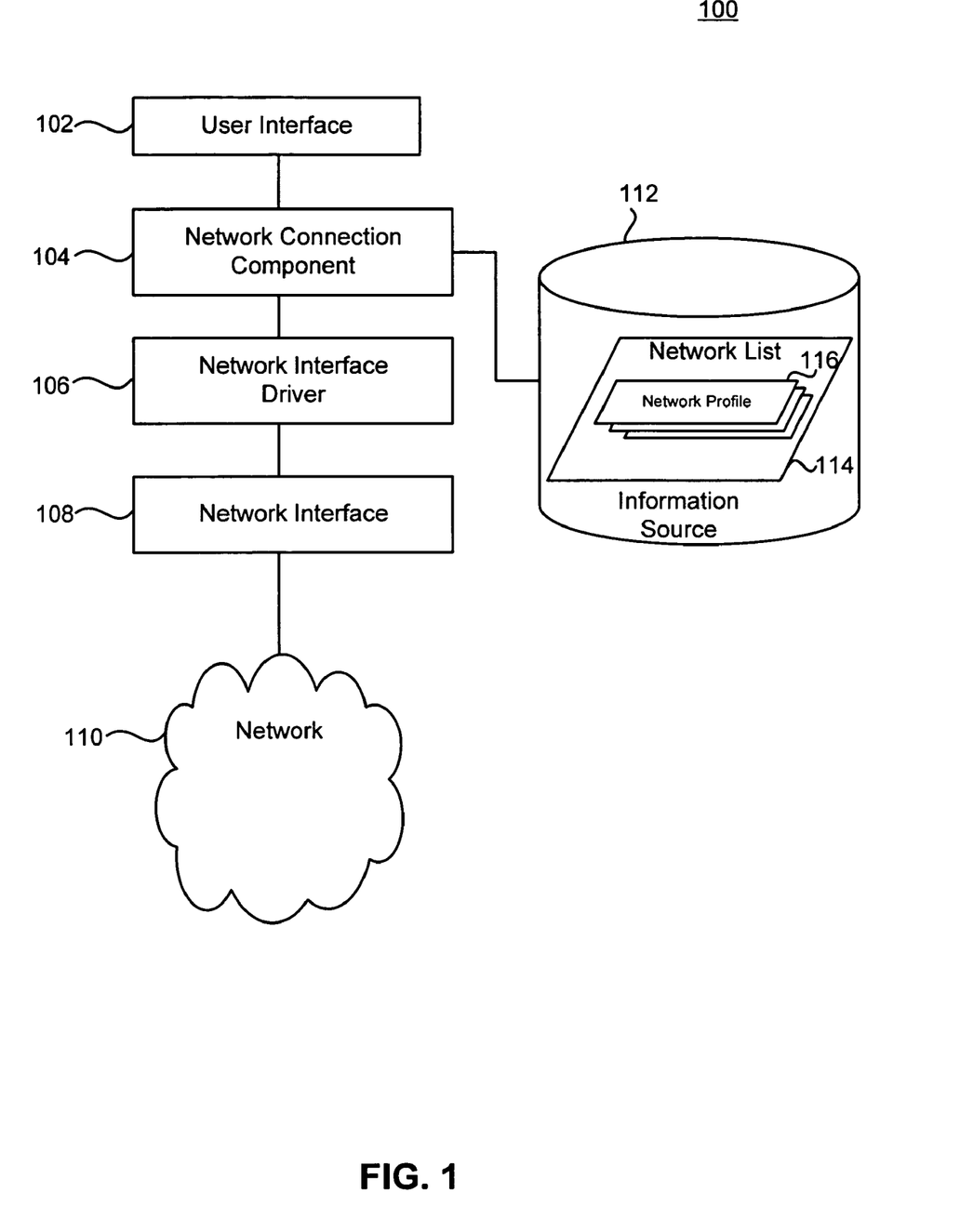
FIG. 1 is a block diagram illustrating an example of a system for determining whether one or more hidden networks are within transmission range of a mobile user device.

FIG. 1 is a block diagram illustrating an example of a system for determining whether one or more hidden networks are within transmission range of a mobile user device. System 100 is merely an illustrative embodiment of a system for making such a determination, and is not intended to limit the scope of the invention. Any of numerous other implementations of such a system, for example, variations of system 100, are possible and are intended to fall within the scope of the invention.

System 100 may include any of: user interface 102; network connection component 104; network interface driver 106; network interface 108; information source 112; network 110; other components; and any suitable combination of the foregoing. One or more (e.g., all) of the components of system 100 may be part of a mobile user device.

Information source 112 may include a network list 114 which may include one or more network profiles 116. Each network profile may specify the wireless network configuration details of a network. For example, a network profile 116 may include one or more information elements including any of the following: network identifier (e.g., name, such as an SSID; security settings; a broadcast flag; a probing field; an auto-connect field; other information; or any suitable combination of the foregoing. The broadcast flag may indicate whether the network represented by the network profile 116 is a hidden or broadcast network, as these terms are described above. The probing field may indicate whether a hidden network is an automatic probing network or an optional probing network as these terms are described above. The auto-connect field may specify whether the mobile user device shall automatically connect to the network if the network is present.

In some embodiments, the network list 114 and/or the individual network profiles 116 may specify a preference order for the networks. That is, a preference order may be specified indicating an order in which a mobile user interface attempts to connect to networks determined to be within transmission range at a given time. It should be appreciated that the information source 112 may be any of a plurality of a types of information sources such as, for example, a database (e.g., an object-oriented database, a relational database, a file system, another type of database, or any suitable combination of the foregoing). Network list 114 and network profile 116 may be stored in any of a variety of formats. For example, network profile 116 may be formatted in accordance with the extensible markup language (XML).

Network connection component (i.e., engine) may be configured to access network list 114, and control a scanning for all broadcast networks specified therein. Further, component 104 may be configured to auto-connect to any hidden or broadcast networks determined to be within the transmission range of the mobile user device herein. Network connection component 104 may control a scanning for the networks by exchanging communications through network interface driver 106 to network interface 108 (e.g., a NIC). Network interface 108 then may scan by listening for communications broadcast from wireless access points such as, for example, beacons transmitted from a wireless access point configured in accordance with IEEE 802.11 standard. The network interface 108 passes the scanning results through driver 106 to component 104.

Network connection component 104 also may be configured to determine whether hidden networks identified in network profile(s) of network list 114 are currently within transmission range of the mobile user device. As noted above, a network profile 116 of a hidden network may specify whether the network is an automatic probing network or an optional probing network. If the profile specifies that the hidden network is an automatic probing network, then network connection component 104 may be configured to control an active probing for the hidden network. Controlling the active probing may involve the network connection component 104 communicating with network interface 108 through driver 106. In response to communications from component 104, interface 108 may actively probe for hidden networks by broadcasting communications including an identifier (e.g., SSID) of the hidden network. Interface 108 may listen for responses to these broadcasts from wireless access points in the vicinity of the mobile user device. The network interface 108 may be configured to send the results of this active probing through driver 106 to network connection component 104.

Network connection component 104 may be configured to apply the preference order specified by network list 114 and/or network profiles 116 to the results of the active probing and scanning. For example, the network connection component may determine the network that has the highest priority within the preference order from among the hidden and broadcast networks determined to be within transmission range, and may attempt to connect to this network. If the connection fails, component 104 may try a next highest network within range according to the preference order.

Network connection component 104 may be configured to communicate with user interface 102 to display to a user the results of the scanning and active probing and/or to indicate a network to which a connection has been made (if any).

In some embodiments, for any networks within the network list 114 having a profile that specifies that the network is an optional probing network, component 104 may specify this information to user interface 102. User interface 102 may display a list of the one or more optional probing networks within network list 114 to the user. For example, this display may be part of a same user interface display that lists the broadcast and automatic probing networks determines to be within transmission range of the mobile user device. It should be appreciated that this user interface display may include an "available networks" list that includes one or more of the foregoing.

User interface 102 may be configured to enable a user to select to determine whether one or more of the optional probing networks are within range of the mobile user device. In response to user input, user interface 102 may exchange communications with network connection component 104, which may control the active probing for the one or more optional probing networks, for example, in the manner described above in relation to actively probing for hidden networks. Thus, active probing may not be performed for optional probing networks without explicit user action, which enables users to prevent exposure of network information when desirable.

In some embodiments of the invention, a wireless access point sends out a broadcast communication (e.g., a beacon) that does not include a network ID (e.g., SSID). Rather, the communication includes a null value in a portion of the communication reserved for the network ID. The interface 108 may detect such communication and pass this information up to component 104 through driver 106. In response to detecting the null value, component 104 may control user interface 102 to display an indication of the existence of the hidden network. It should be appreciated that the hidden network is a hidden network previously unknown by the mobile user device. That is, the user device has not previously created a network definition for the network. The indicia of previously unknown hidden network may be included on the same user interface display as the broadcast and hidden networks determined to be within range of the mobile user device and/or the optional probing networks for which it is not yet been determined whether the hidden networks are within range.

The user interface may be configured to enable a user to create a network definition for the previously unknown hidden network and/or specify that a connection be established to such network.

Figure 2:
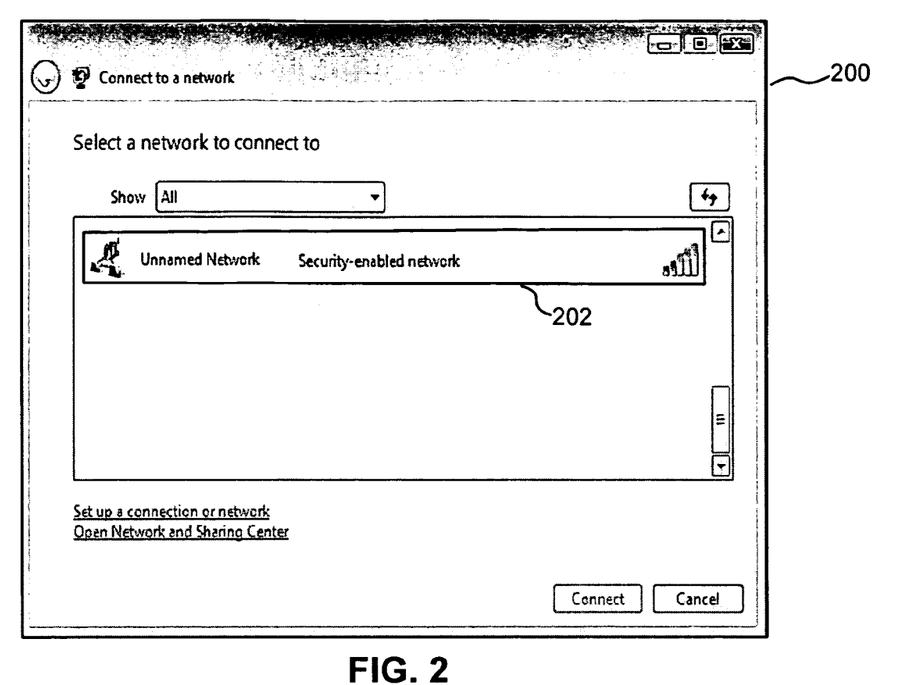
FIG. 2 illustrates an example of a user interface display including indicia of a hidden network previously unknown to the mobile user device, according to some embodiments of the invention.
Figure 3:
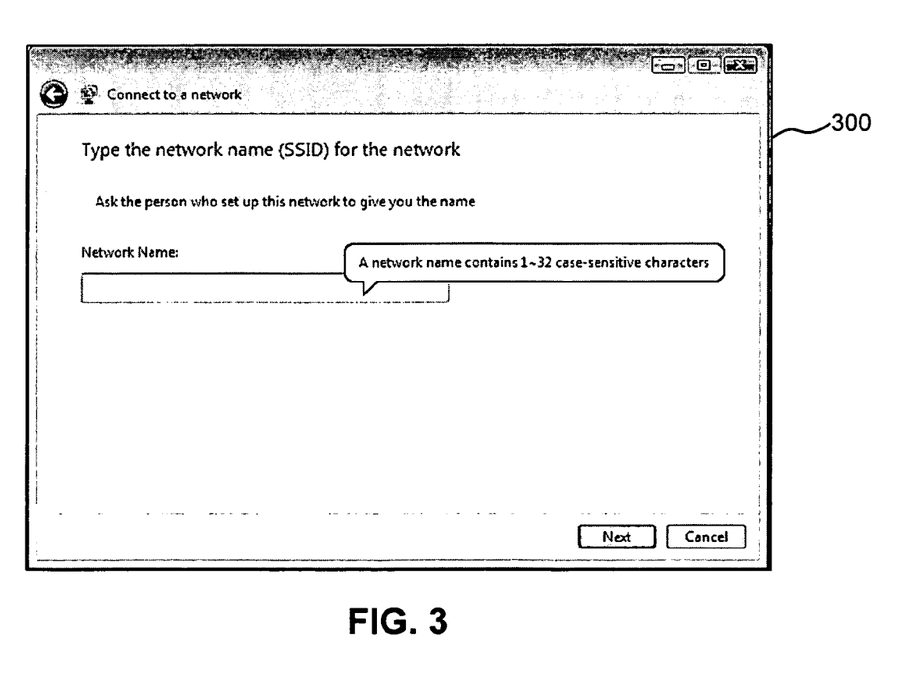
FIG. 3 illustrates an example of a user interface display enabling a user to create a network definition for a previously unknown hidden network, according to some embodiments of the invention.

For example, FIG. 2 illustrates an example of a user interface display 200 including indicia 202 of a hidden network previously unknown to the mobile user device, according to some embodiments of the invention. Further, FIG. 3 illustrates an example of a user interface display 300 enabling a user to create a network definition for a previously unknown hidden network, according to some embodiments of the invention.

System 100 and components thereof may be implemented using any of a variety of technologies, including software (e.g., C, C#, C++, Java, J# or a combination thereof), hardware (e.g., one or more application-specific integrated circuits), firmware (e.g., electrically-programmed memory) or any combination thereof. Further, each of the components of system 100 may reside in one or more locations on the system 100. For example, different portions of the components may reside in different areas of memory (e.g., RAM, ROM, disc, etc.) on the system 100. System 100 may include, among other components, a plurality of known components such as one or more processors, a memory system, a disc storage system, one or more network interfaces, and one or more busses or other internal communication links interconnecting the various components. System 100, and components thereof, may be implemented using one or more computer systems such as the computer system described below in relations to FIGS. 5 and 6.

Figure 4:
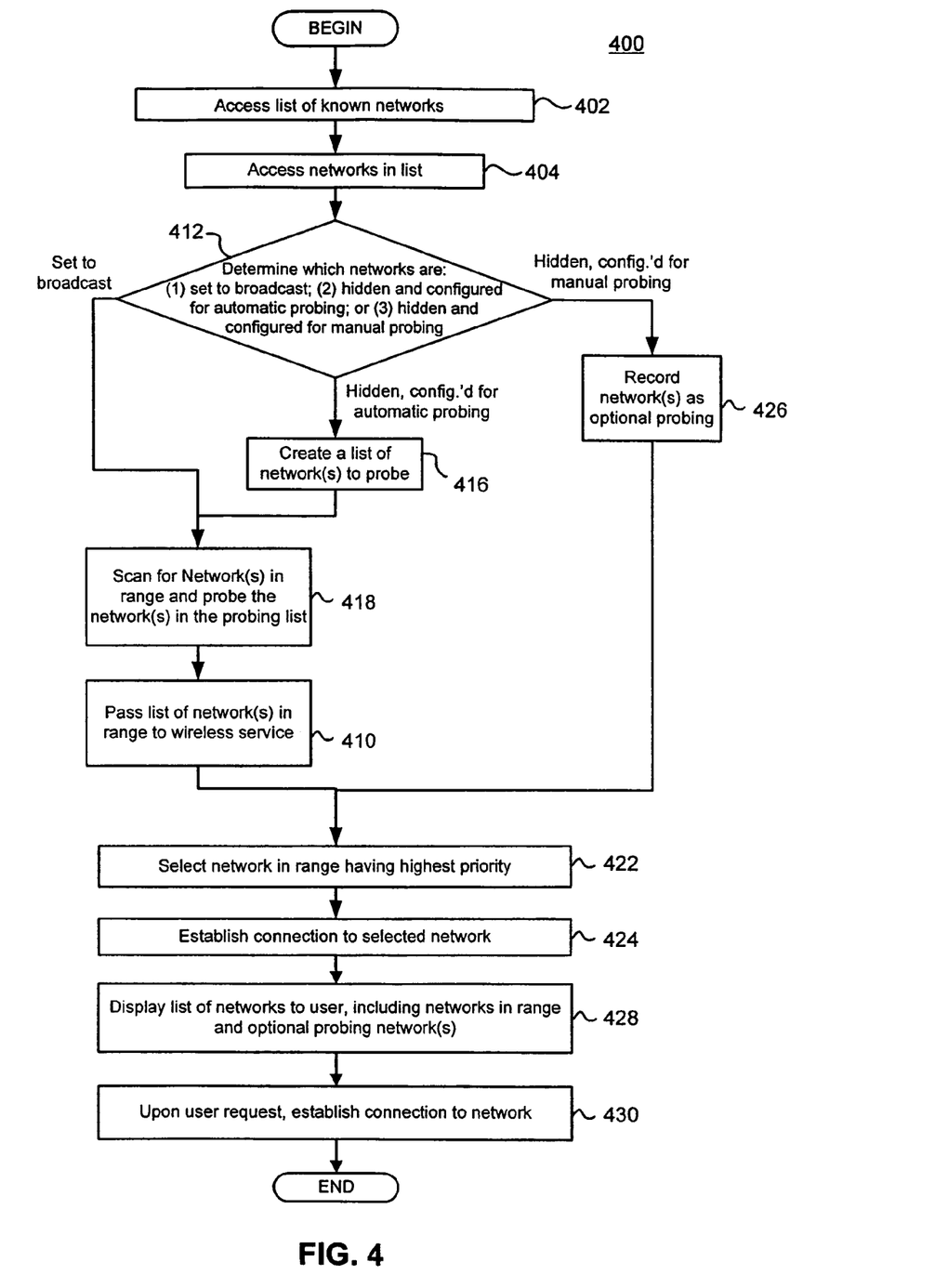
FIG. 4 is a flow chart illustrating an example of a method of detecting and/or connecting to one or more hidden networks within the transmission range of a mobile user device, according to some embodiments of the invention.

FIG. 4 is a flow chart illustrating an example of a method 400 of detecting and/or connecting to one or more hidden networks within the transmission range of a mobile user device, according to some embodiments of the invention. Method 400 is merely an illustrative embodiment of a method of detecting and/or connecting to one or more hidden networks, and is not intended to limit the scope of the invention. Other implementations, such as variations of method 400, are possible and are intended for fall within the scope of the invention.

In Act 402, a list of known networks is accessed, for example, as described above in relation to network list 114 of system 100. In Act 404, the network(s) in the list (e.g., specified by a network profile 116) are accessed.

In Act 412, a determination is made as to whether the network(s) in the list are set to broadcast (i.e. not hidden), or hidden and configured for automatic probing, or hidden and configured for manual probing.

For the network(s) which are determined in Act 412 to be hidden and configured for manual probing, the process proceeds to Act 426, wherein the network(s) is (are) recorded as optional probing. For example, network interface 108 may create a list of networks determined to be optional probing and pass this list through driver 106 to network controller component 104. Alternatively, component 104 may create the list from information received from interface 108. Other techniques may be used.

For the network(s) which are determined in Act 412 to be hidden and configured for automatic probing, the process proceeds to Act 416, wherein a list comprising one or more networks to probe is created.

For the network(s) which are determined in Act 412 to be set to broadcast, and upon the completion of Act 416 for the network(s) that are determined to be hidden and configured for automatic probing, the process proceeds to Act 418, wherein a scan for the network(s) in range and a probe of the network(s) in the probing list are performed. For example, an active probe may be performed for the network(s), such as is described above in relation to system 100. The process then proceeds to Act 410, wherein a list of the network(s) in range are passed to the wireless service. This may be performed using similar techniques to those described above in relation to Act 426.

Upon the completion of Acts 410 and 426, the process proceeds to Act 422, wherein a network determined to be within transmission range of the mobile user device having the highest priority is selected. This may be performed, for example, via the application of a preference list as described above in relation to system 100. In Act 424, a connection may be established to the selected network.

In Act 428, a list of networks is displayed to the user. This list may include networks in range, including broadcast and active probing networks, and also may include one or more optional probing networks for which it has not been determined whether the one or more optional probing networks are in range.

Although a connection to a selective network may be established in Act 424 (e.g., by auto-connection logic as described above in relation to system 100), in Act 430, a connection to another network may be established upon request by the user.

That is, a user may override the connection resulting from the auto-connection logic, and request that a connection be established to another network.

Method 400 may include additional acts. Further, the order of the acts performed as part of method 400 is not limited to the order illustrated in FIG. 4, as the acts may be performed in other orders and/or one or more of the act may be performed in parallel, at least partially. For example, establishing a connection to a network in Act 424 may be performed in parallel or after the display of the networks in Act 428.

Figure 5:
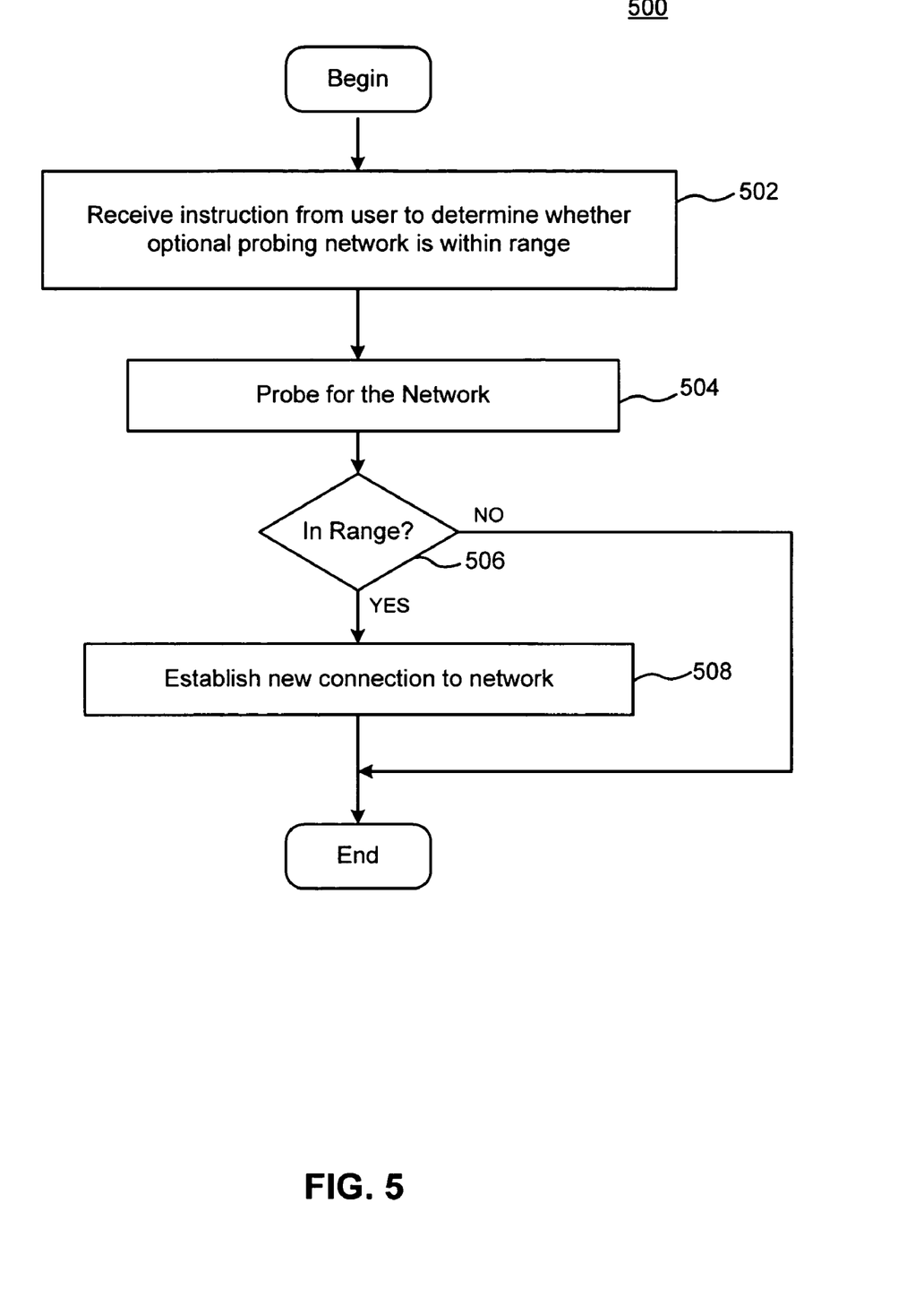
FIG. 5 is a flowchart illustrating an example of a method of enabling a user to actively probe a hidden network, according to some embodiments of the invention.

As described above, a user interface (e.g., user interface 102) may be configured to enable a user to instruct that an active probing of an optional probing network be performed. FIG. 5 is a flowchart illustrating an example of a method 500 for enabling a user to determine whether active probing of a hidden network is performed, according to some embodiments of the invention. Method 500 is merely an illustrative embodiment of a method of enabling a user to determine whether to actively probe for a hidden network, and is not intended to limit the scope of the invention. Other implementations of such a method, for example, variations of method 500, are possible and are intended to fall within the scope of the invention.

In Act 502, an instruction may be received from the user to determine whether the optional probing network is within range, in response to which a probe may be performed for the network in Act 504, for example, as described above in relation to system 100.

If it is determined in Act 506 that the optional probing network is not within range, then method 500 ends. Otherwise, in Act 508 a new connection is established to the network. This may be performed in a manner similar to that which is described above in relation to Act 424.

Method 500 may include additional acts. Further, the order of the acts as part of method 500 is not limited to the order illustrated in FIG. 5, as the acts may be performed in other orders and/or one or more of the acts may be performed in parallel, at least partially. For example, Acts 510-512 may be performed after the performance of Acts 502-508 for each optional probing network specified by the user, or after Acts 502-508 have been performed for all optional probing networks specified by the user.

Figure 6:
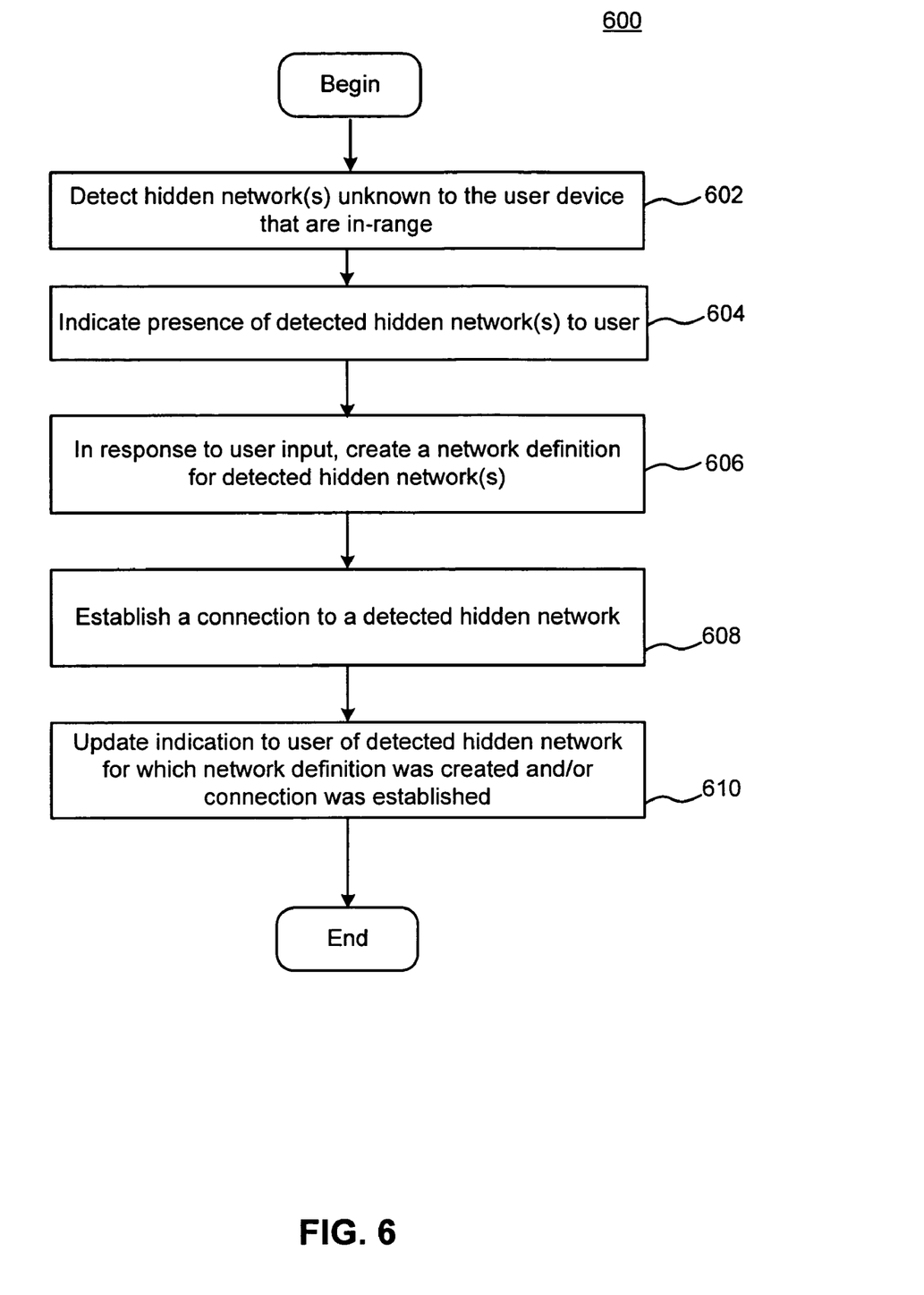
FIG. 6 is a flow chart illustrating an example of a method for enabling a user to initiate communications with a previously unknown hidden network, according to some embodiments of the invention.

As described above in relation to FIG. 1, in some embodiments of the invention, it may be determined whether a previously unknown hidden network is within transmission range of a mobile user device. FIG. 6 is a flow chart illustrating an example of a method 600 for enabling a user to initiate communications with a previously unknown hidden network, according to some embodiments of the invention. Method 600 is merely an illustrative embodiment of a method for enabling a user to initiate communications of the previously unknown hidden network, and is not intended to limit the scope of the invention. Other implementations of such a method, for example, variations of method 600, are possible and are intended to fall within the scope of the invention.

In Act 602, it may be detected that one or more hidden networks previously unknown to the mobile user device are within transmission range of the mobile user device, for example, as described above in relation to system 100.

In Act 604, the presence of the one or more detected networks may be indicated (e.g., displayed) to the user, for example, with a user interface such as the user interface 102 described above in relation to system 100 and the user interface display 200 of FIG. 2.

In response to user input, a network definition may be created for one or more detected hidden networks, for example, as described above in relation to system 100 and user interface display 300 described above in relation to FIG. 3.

In Act 608, a connection may be established to one or more of the detected hidden networks, for example, automatically or in response to instructions received from the user through a user interface.

As a result of Act 606 and/or Act 608, the indication to the user of a detected hidden network may be updated to reflect that a network definition was created for the hidden network and/or a connection was established to the network. As described above, this indication may be part of a user interface display which also displays broadcast and hidden networks determined to be within transmission range of the mobile user device and/or one or more optional probing networks.

Method 600 may include additional acts. Further, the order of the acts performed as part of method 600 is not limited to the order illustrated in FIG. 6, as the acts may be performed in other orders and/or one or more of the acts may be performed in parallel, at least partially. For example, Act 610 may be performed in parallel and/or before the performance of Act 608 and/or Act 606.

Methods 400, 500, 600 and/or acts thereof, various embodiments and variations of these methods and these acts and other methodologies and techniques described above, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (including methods 400, 500, 600 and/or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 700 and 800 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Figure 7:
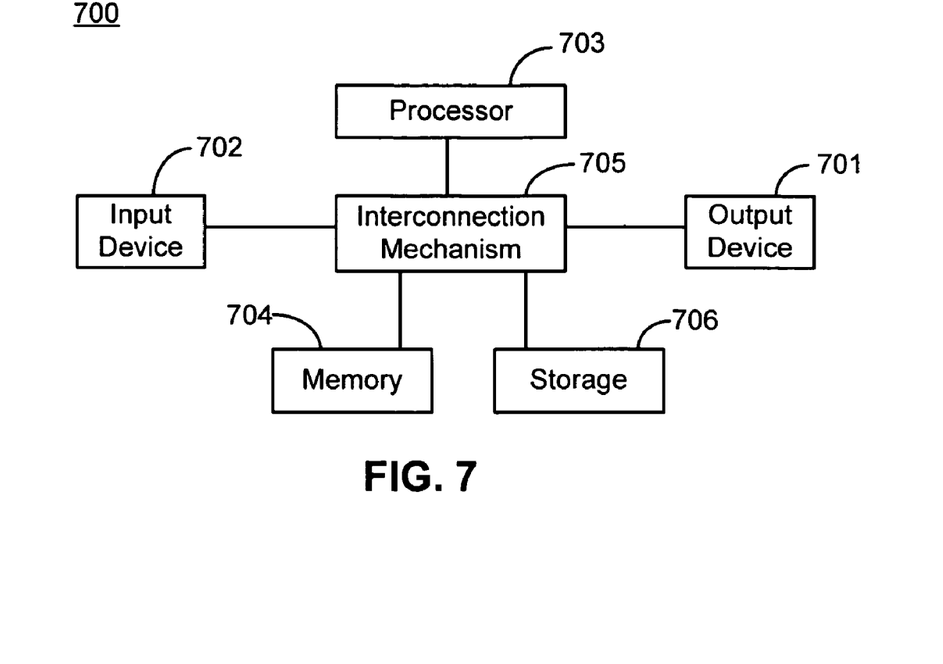
FIG. 7 is a block diagram illustrating an example of a computer system on which some embodiments of the invention may be implemented.
Figure 8:
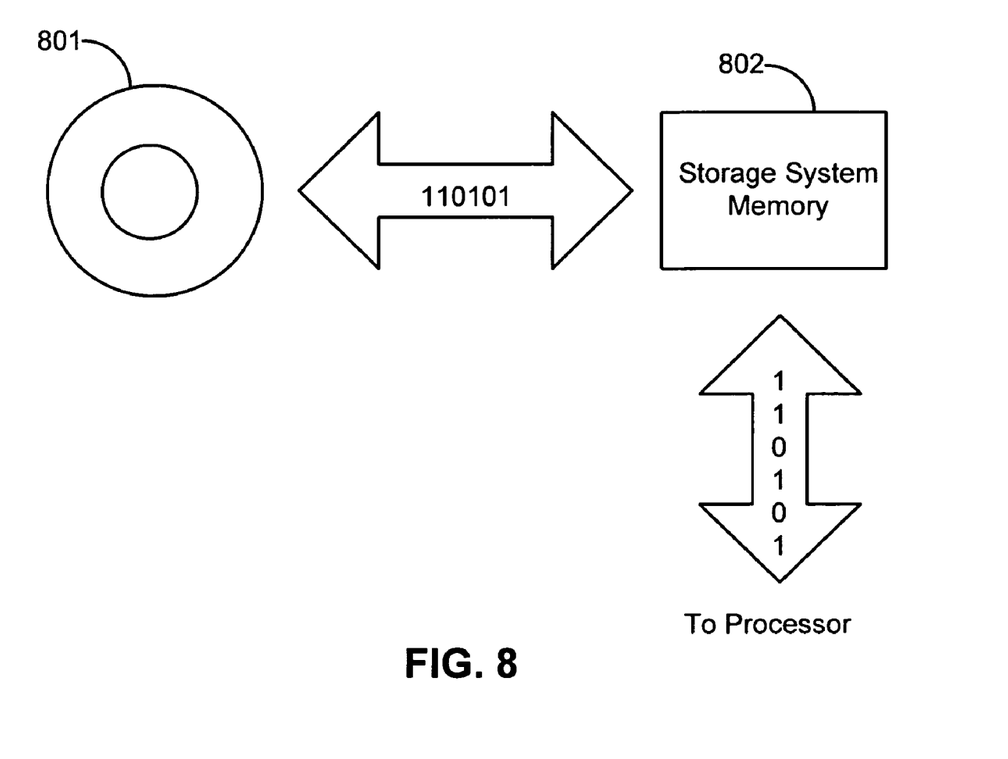
FIG. 8 is a block diagram illustrating an example of a storage system that may be used as part of the computer system to implement some embodiments of the invention.

It should be appreciated that any single component or collection of multiple components of a computer system, for example, any of the computer systems described in relation to FIGS. 1, 7 and 8, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

For example, various aspects of the invention may be implemented as specialized software executing in a general-purpose computer system 700 such as that shown in FIG. 7. The computer system 700 may include a processor 703 connected to one or more memory devices 704, such as a disk drive, memory, or other device for storing data. Memory 704 is typically used for storing programs and data during operation of the computer system 700. Components of computer system 700 may be coupled by an interconnection mechanism 705, which may include one or more busses (e.g., between components that are integrated within a same machine) and/or a network (e.g., between components that reside on separate discrete machines). The interconnection mechanism 705 enables communications (e.g., data, instructions) to be exchanged between system components of system 700. Computer system 700 also includes one or more input devices 702, for example, a keyboard, mouse, trackball, microphone, touch screen, and one or more output devices 701, for example, a printing device, display screen, speaker. In addition, computer system 700 may contain one or more interfaces (not shown) that connect computer system 700 to a communication network (in addition or as an alternative to the interconnection mechanism 705).

The storage system 706, shown in greater detail in FIG. 8, typically includes a computer readable and writeable nonvolatile recording medium 801 in which signals are stored that define a program to be executed by the processor or information stored on or in the medium 801 to be processed by the program. The medium may, for example, be a disk or flash memory. Typically, in operation, the processor causes data to be read from the nonvolatile recording medium 801 into another memory 802 that allows for faster access to the information by the processor than does the medium 801. This memory 802 is typically a volatile, random access memory such as a dynamic random access memory (DRAM) or static memory (SRAM). It may be located in storage system 706, as shown, or in memory system 704, not shown. The processor 703 generally manipulates the data within the integrated circuit memory 704, 802 and then copies the data to the medium 801 after processing is completed. A variety of mechanisms are known for managing data movement between the medium 801 and the integrated circuit memory element 704, 802, and the invention is not limited thereto. The invention is not limited to a particular memory system 704 or storage system 706.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 700 is shown by way of example as one type of computer system upon which various aspects of the invention may be practiced, it should be appreciated that aspects of the invention are not limited to being implemented on the computer system shown in FIG. 7. Various aspects of the invention may be practiced on one or more computers having a different architecture or components that that shown in FIG. 7.

Computer system 700 may be a general-purpose computer system that is programmable using a high-level computer programming language. Computer system 700 also may be implemented using specially-programmed, special-purpose hardware. In computer system 700, processor 703 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) Windows® XP or Windows® Vista™ operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of initiating communications between a mobile user device and a network, the method comprising acts of:
   (A) accessing a list of known networks previously defined on the mobile user device, the list of known networks comprising at least one non-hidden network and a first plurality of hidden networks, the first plurality of hidden networks comprising one subset for which the mobile user device is configured to automatically probe, and another subset for which the mobile user device is configured to probe only upon receiving an instruction from the user;
   (B) automatically determining which of the at least one non-hidden network and the one subset of the first plurality of hidden networks are within transmission range of the mobile user device;
   (C) automatically determining whether at least one second hidden network, previously unknown to the mobile user device, is within transmission range of the mobile user device;
   (D) receiving an instruction from a user to determine whether one or more of the another subset of the first plurality of hidden networks is within transmission range of the mobile user device;
   (E) determining whether any of the one or more of the another subset of the first plurality of hidden networks is within transmission range of the mobile user device;
   (F) selecting, from among networks determined to be within transmission range of the mobile user device in (B), (C) or (E), a network to which to connect, the selecting employing a predefined precedence order encompassing at least one hidden network and at least one non-hidden network.

2. The method of claim 1, wherein the act (B) comprises, for each first hidden network, probing for the first hidden network by transmitting from the mobile user device a wireless communication including an identifier of the first hidden network.

3. The method of claim 1, wherein the act (B) further comprises receiving a response to a wireless communication from one or more of the one subset.

4. A tangible computer-readable storage medium device having instructions encoded thereon which, when executed, perform a method of enabling a user of a mobile user device to initiate communications between the mobile user device and a network, the method comprising acts of:
   (A) providing a user interface display to the user, the user interface display including a list of one or more networks, the list including a first plurality of hidden networks previously defined on the mobile user device, the first plurality of hidden networks comprising one subset for which the mobile user device is configured to automatically probe, and another subset for which the mobile user device is configured to probe only upon receiving an instruction from the user;
   (B) enabling a user to select one or more networks of the another subset of first hidden networks for determination of whether the one or more networks is within transmission range of the mobile user device;
   (C) probing for the selected one or more networks by transmitting from the mobile user device a wireless communication including an identifier of the one or more networks;
   (D) automatically determining whether any of the one subset of the first plurality of hidden networks is within transmission range of the mobile user device;

(E) automatically determining whether any one or more second hidden networks, previously unknown to the mobile user device, is within transmission range of the mobile user device;

(F) selecting, from among networks determined to be within transmission range of the mobile user device in (C), (D) or (E), a network to which to connect, the selecting employing a predefined precedence order encompassing at least one hidden network and at least one non-hidden network.

* * * * *